United States Patent [19]

Wilson

[11] Patent Number: 4,741,030

[45] Date of Patent: Apr. 26, 1988

[54] COMMUNICATIONS HEADSET

[76] Inventor: Wesley T. Wilson, 4540 Hunting Hound La., Marietta, Ga. 30062

[21] Appl. No.: 925,840

[22] Filed: Oct. 31, 1986

[51] Int. Cl.$^4$ .......................... H04M 1/05; H04M 1/30
[52] U.S. Cl. ..................................... 379/368; 379/430
[58] Field of Search .............. 379/368, 430, 431, 434, 379/433; 381/74, 25, 183, 187; D14/36; 455/89

[56] References Cited

U.S. PATENT DOCUMENTS

| D. 226,273 | 2/1973 | Tyson | D14/36 |
|---|---|---|---|
| 299,288 | 5/1884 | Stewart | 381/183 |
| 1,568,721 | 1/1926 | Butcher et al. | 381/183 |
| 2,485,405 | 10/1949 | Olney et al. | 379/430 |
| 3,781,492 | 12/1973 | Cragg et al. | 379/430 |
| 3,786,519 | 1/1974 | Aileo | 381/187 X |
| 3,971,900 | 7/1976 | Foley | 379/430 |
| 4,020,297 | 4/1977 | Brodie | 379/430 |
| 4,042,793 | 8/1977 | Bellenger | 379/433 X |

FOREIGN PATENT DOCUMENTS

| 0723955 | 8/1942 | Fed. Rep. of Germany | 381/183 |
|---|---|---|---|
| 1133582 | 11/1968 | United Kingdom | 381/183 |
| 1139718 | 1/1969 | United Kingdom | 381/183 |
| 2079099 | 1/1982 | United Kingdom | 381/187 |

Primary Examiner—Jin F. Ng
Assistant Examiner—R. Vaas
Attorney, Agent, or Firm—Rodgers & Rodgers

[57] ABSTRACT

A cordless headset includes a headband, a tubular support having one end mounted on the headband, a housing mounted on the other end of the tubular support and having spaced apart opposed walls on the outer surface of which a plurality of telephone operating digits are arranged in a circular pattern for controlling output signals, aligned central apertures formed in the opposed walls of the housing, and a microphone positioned in the housing and aligned with the apertures.

8 Claims, 2 Drawing Sheets

COMMUNICATIONS HEADSET

TECHNICAL FIELD

This invention relates to a headset which is light in weight and capable of being operated by one hand only of the user so as to free the other hand and which includes a transmitter, a receiver together with suitable devices arranged in close compact convenient association with the transmitter such as a speaker microphone.

BACKGROUND ART

U.S. Pat. No. 2,410,434 issued Nov. 5, 1946 and U.S. Pat. No. 3,902,025 issued Aug. 26, 1975 disclose telephones which include in one component a receiver, a transmitter and a dial or punch button digit output system. Neither of these devices is in the form of a headset and they are not of light weight construction.

U.S. Pat. No. 4,020,297 issued Apr. 26, 1977 and U.S. Pat. No. 4,039,765 issued Aug. 2, 1977 both disclose headsets with adjustable microphones. Neither of these two references discloses a system having a keyboard with digits arranged to control output signals.

SUMMARY

According to this invention in one form, a light weight cordless communications head set is provided and comprises a headband, a tubular support having one end mounted on the headband and including elongated extensible and retractable means adjustably positioned angularly relative to the headband, a housing rotatably mounted on the other end of the tubular support and having spaced apart walls each of which includes an outer planar surface having a keyboard each of which includes a plurality of telephone operating digits positioned in a circular path for controlling the initiation of output signals, aligned central apertures formed in the opposed walls of the housing for exposing parts of a microphone positioned within the housing and arranged in alignment with the apertures.

BEST MODE OF CARRYING OUT THE INVENTION

Figure 1:
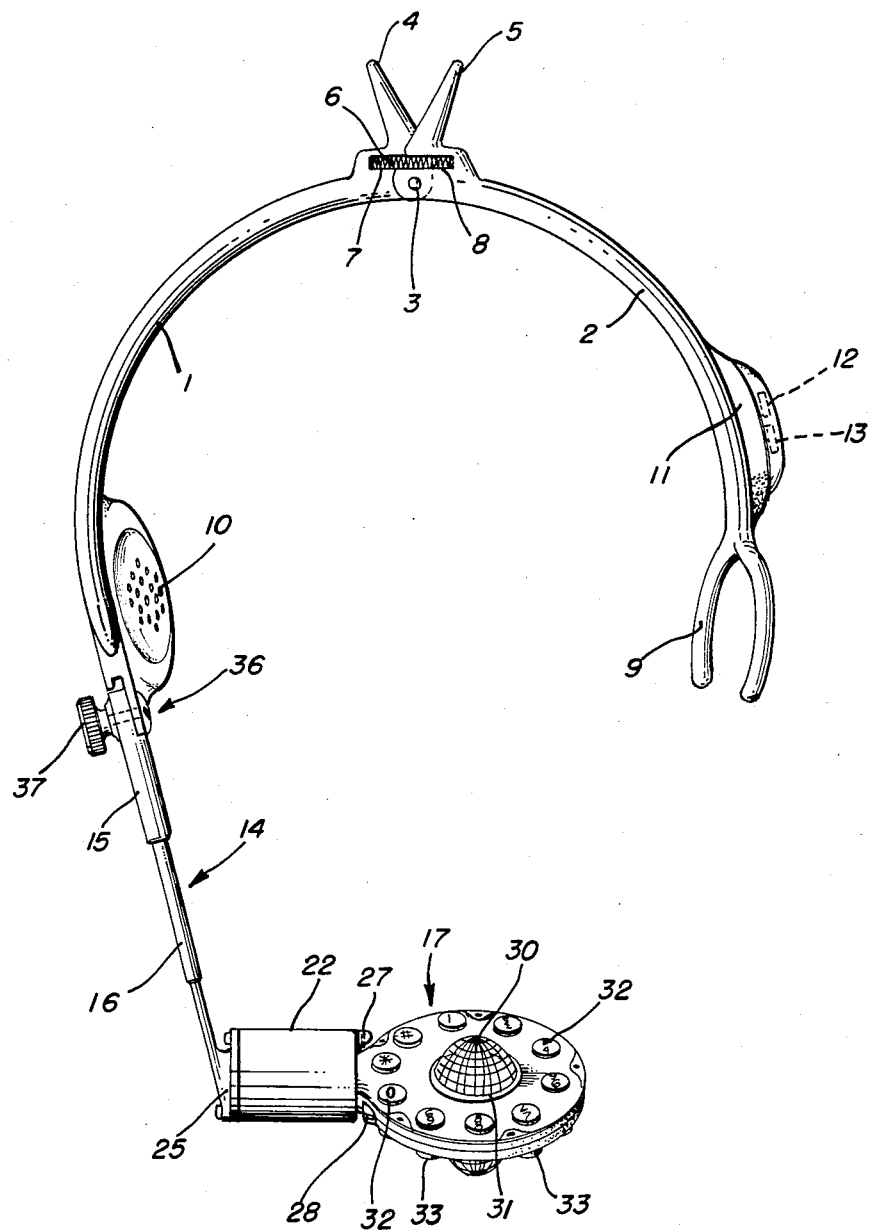
FIG. 1 is an overall front view of the headset which shows the housing in perspective and slightly tilted from its normal operating positions.

As shown in FIG. 1, the headband includes a pair of components 1 and 2 which are pivotally interconnected at pin 3. Upwardly extending projection 4 is integrally formed with component 1 while upwardly extending projection 5 is integrally formed with component 2 to form unitary elements. A compressional spring 6 is disposed within a cavity 7 formed in component 1 and a cooperating cavity 8 formed in component 2. Thus an inward force applied to upwardly extending projections 4 and 5 swings components 1 and 2 apart and is against the bias of compression spring 8 so that when the headband is placed over the head of the user and the inward force on projection 4 and 5 is released, the compression spring 8 gently urges the headband into snug relation about the head of the user.

A U-shaped ear rest 9 is formed on the lower end of component 2 and simply overlies one ear of the user while a receiver 10 is mounted at the lower end of component 1 and is disposed adjacent the other ear of the user. A rechargeable battery is generally indicated at 11 and includes a pair of contacts 12 and 13 which are used during a recharging operation of the rechargeable battery.

Figure 2:
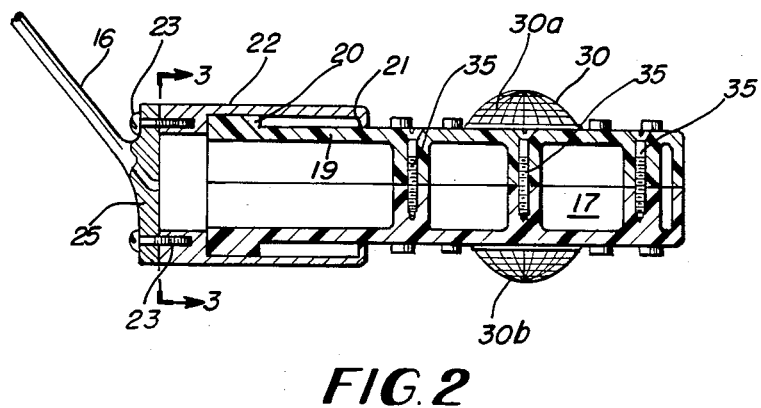
FIG. 2 is an enlarged cross sectional front view of the lower portion of FIG. 1.
Figure 3:
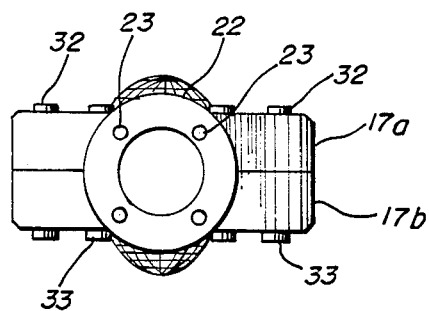
FIG. 3 is a view taken along the line designated 3—3 in FIG. 2.

Extensible and retractable tubular support 14 includes an outer tubular element 15 together with an inner tubular element 16 which is telescopically related with the outer tubular element 15. These extensible and retractable telescopic elements serve to lower and to raise the housing generally designated by the numeral 17. This housing 17 is provided with a lateral cylindrical projection in the form of an inner cylindrical element 19 having an outwardly projecting flange 20 which is engageable with the inwardly projecting flange 21 formed on outer cylinder 22. Cylinder 22 is secured to elements 16 and 25 by means of bolts 23. Thus the housing 17 may be shifted from left to right as viewed in FIGS. 1, 2 and 3 and is also rotatable about an axis X—X.

Figure 4:
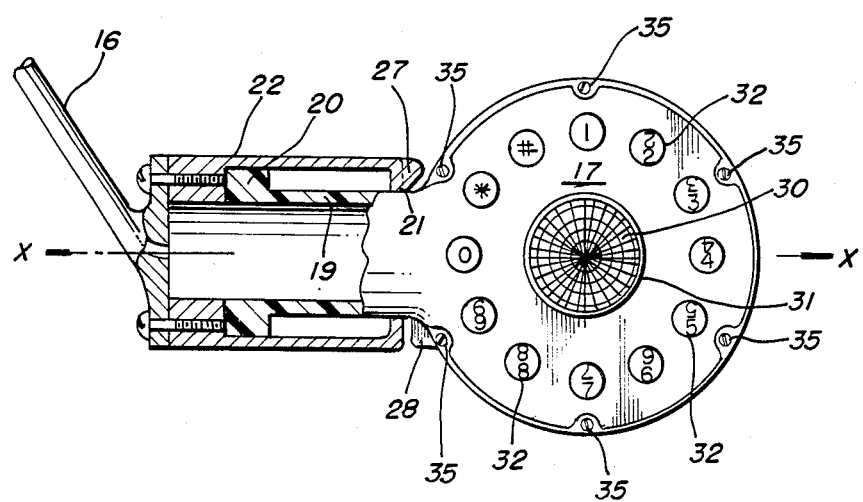
FIG. 4 is a view similar to FIG. 2 but which shows the housing rotated to a position approximately 90 degrees to horizontal.

For limiting the rotation of the housing 17 about the axis X—X of cylinders 19 and 22, a stop 27 is formed on cylinder 22 and a cooperating stop 28 is formed on housing 17 as best shown in FIG. 4.

The microphone 30 is disposed within the aperture 31 formed in housing 17 and includes sound responsive elements 30a and 30b which extend above and below the main body of the housing 17 having opposite surfaces.

Push buttons such as are indicated at 32 are disposed on one surface of the housing 17 as is apparent from FIG. 4. Additional buttons such as 33 are disposed on the opposite surface of housing 17 as shown in FIG. 1. Of course these buttons such as buttons 32 and buttons 33 are of conventional construction. One half of housing 17 is indicated at 17a while another portion is indicated at 17b. These parts are secured together by screws 35 and include aligned central apertures 31.

For the purpose of adapting this headset in such manner that the receiver 10 may be shifted from one ear of the user to occupy the other ear of the user and similarly to shift the U-shaped ear rest from one ear to the other, the tubular support 14 is secured to the lower end of component 1 by a split ball joint generally designated by the numeral 36 and which includes an adjustable knob 37. By this joint, swinging movement of the tubular support 14 and of the housing 17 may be shifted forwardly or in a rearward direction.

In order to make a call according to a feature of this invention, the extensible tube 16 together with the housing 17 are lowered by extending the inner tube 16 downwardly relative to the outer tube 15. This motion places the housing 17 in a position for ready observation by the user. After a call is made using the push buttons such as 32, the tube 16 may be elevated so as to bring the microphone 30 close to the mouth of the user. If auxiliary buttons are to be used, the tube 16 is extended downwardly and the housing 17 is rotated about axes X—X through an angle of approximately 180 degrees so as to bring the auxiliary function buttons 33 into view of the user and with the call buttons 32 disposed on the underside of housing 17. It is obvious that ready access is had to the microphone 30 irrespective of whether the call buttons 32 are being used or the auxiliary buttons 33 are being used due to the fact that the microphone 30 includes projecting portions 30a and 30b which extend in opposite directions from the body of the module 17.

An antenna not shown may conveniently be affixed in any suitable manner to the headset and according to one feature of the invention may be closely associated with the components 1 and 2 of the head band. Furthermore, conductors associated with the apparatus may be appropriately connected in known manner to interrelate the various components and may be disposed within the components 1 and 2 and within the extensible and retractable support means 14 and the cylinders 19 and 22 and may interconnect the microphone 30 in any suitable known manner as may be desired.

I claim:

1. A communications headset comprising a headband, a tubular support having one end mounted on said head band and including elongated extensible and retractable means adjustably positioned angularly relative to said head band, a housing mounted on the other end of said tubular support and having opposite surfaces each of which includes an outer planar surface having a keyboard each of which includes a plurality of telephone operating digits positioned in a circular pattern for controlling the institution of output signals, aligned central apertures extending through said opposite surfaces, and a microphone positioned within said housing and arranged in alignment with said apertures and having parts projecting therethrough.

2. A communications headset according to claim 1 wherein said housing is rotatably mounted on said tubular support for rotation through an angle of approximately 180 degrees about an axis generally parallel to the planar surfaces thereof so as to afford convenient manual access to and ready visual observation of either planar surface.

3. A communications headset according to claim 1 wherein said housing includes an inner cylindrical element and wherein a cylinder is fixedly secured to said other end of said tubular support and within which said cylindrical element is rotatable and slidable.

4. A communications headset according to claim 3 wherein said inner cylindrical element forms an integral part of said housing.

5. A communications headset according to claim 3 wherein a stop is fixedly disposed on said inner cylindrical element, and a stop is fixedly positioned on said cylinder whereby rotation in either direction of said housing is limited substantially to 180 degrees due to engagement of said stops with each other.

6. A communications headset according to claim 1 wherein said headband comprises a pair of pivotally connected components biased toward the head of the user and having manually engageable projections for moving said components away from the head of the user and wherein a cavity is formed in the adjacent ends of said components and wherein a compression spring is disposed within said cavities and arranged to impart a biasing force to said components which is toward the head of the user.

7. A communications headset according to claim 6 wherein a receiver is mounted on an end of one of said components and a battery is mounted near an end of the other of said components.

8. A communications headset according to claim 6 wherein a U-shaped ear rest is mounted on said end of said other component.

* * * * *